United States Patent [19]

Hoch

[11] Patent Number: 5,149,444
[45] Date of Patent: Sep. 22, 1992

[54] PROCESS FOR THE DECONTAMINATION OF SOILS, SEDIMENTS, AND SLUDGES

[75] Inventor: Robert Hoch, Hensonville, N.Y.

[73] Assignee: SDTX Technologies, Inc., Princeton, N.J.

[21] Appl. No.: 547,839

[22] Filed: Jul. 3, 1990

Related U.S. Application Data

[63] Continuation-in-part of Ser. No. 516,262, Apr. 30, 1990, Pat. No. 5,096,600.

[51] Int. Cl.$^5$ .............................................. B09B 3/00
[52] U.S. Cl. ..................... 210/751; 210/758; 210/765; 210/766; 210/805; 210/908; 210/909; 210/925; 134/50; 423/DIG. 20; 405/128; 405/263; 405/264; 208/262.5
[58] Field of Search ............... 210/749, 751, 634, 908, 210/909, 925, 750, 758, 765, 766, 805; 423/DIG. 20; 405/128, 263, 264; 134/50; 208/262.5; 568/611

[56] References Cited

U.S. PATENT DOCUMENTS

| | | | |
|---|---|---|---|
| 4,574,013 | 3/1986 | Peterson | 134/2 |
| 4,844,807 | 7/1989 | Manchak, Jr. | 405/263 |
| 4,864,942 | 9/1989 | Fochtman et al. | 110/226 |

Primary Examiner—Robert A. Dawson
Assistant Examiner—David Reifsnyder
Attorney, Agent, or Firm—Curtis, Morris & Safford

[57] ABSTRACT

A method for the decontamination of a soil, sediment, or sludge containing toxic halogenated organic compound and containing water comprising the steps of mixing said soil, sediment, or sludge with a reagent capable of reacting with said halogenated compound and heating said mixture of soil, sediment, or sludge, and reagent in a reaction zone to an elevated temperature thereby forming a reaction zone vapor stream containing at least a portion of the water contained in said soil, sediment, or sludge and unreacted halogenated organic compound; condensing a portion of said reaction zone vapor stream under conditions suitable for the formation of a condensate stream containing substantially all of the halogenated organic compound in said reaction zone vapor stream, and a vapor stream containing water and trace amounts of said halogenated organic compound; recycling said condensate to said reaction zone; treating said vapor stream to remove trace halogenated organic compound and venting the so-treated stream to the atmosphere; and removing soil, sediment, or sludge containing less contaminant from said reaction zone.

20 Claims, 4 Drawing Sheets

PROCESS FOR THE DECONTAMINATION OF SOILS, SEDIMENTS, AND SLUDGES

This application is a continuation-in-part of copending application Ser. No. 516,262, filed Apr. 30, 1990 now U.S. Pat. No. 5,096,600, the contents of which are incorporated herein.

FIELD OF THE INVENTION

This invention relates to the treatment of soils, sediments, and sludges, to degrade and detoxify halogenated organic contaminants. More specifically, this invention relates to efficient methods to chemically degrade polychlorinated biphenyls (PCBs) in contaminated soil in a process having low capital and operating costs. Even more specifically, this invention relates to process steps for the efficient handling and disposition of water introduced into the process either in a wet soil, sediment, or sludge, or as a carrier for a decomposition reactant.

BACKGROUND OF THE INVENTION

Soils containing PCBs have posed serious environmental hazards. The PCBs are toxic to both plants and animals, are known to bioaccumulate and present serious health hazards. It has been observed that PCBs have extremely slow biodegradation rates and their persistence and toxicity have prompted serious governmental action restricting their use and application. Even trace amounts of PCBs are environmentally undesirable.

Among the halogenated compounds which pose dangers to the environment are halogenated aliphatic compounds, e.g., trichloroethylene, and chlorinated aromatic compounds, e.g., polychlorinated biphenyls (PCBs). Prior to 1970, PCBs were used in a wide range of applications due to their attractive physical properties. They were used as plasticizers, waterproofing compounds, lubricants, heat transfer fluids, hydraulic fluids, etc. Their primary use was in the electrical industry as dielectric media in transformers and capacitors.

A number of methods have been proposed for treating soils containing halogenated organic compounds. Incineration, while an approved method, is expensive and hazardous if uncontrolled. Other methods are based on the use of large amounts of expensive reagents or the treatment of the soil to thermally desorb the PCBs or to solvent-extract the PCBs and subsequently dehalogenate them.

One such method is that disclosed in Peterson, U.S. Pat. Nos. 4,447,541 and 4,574,013. These patents are directed to processes for the decontamination of soil wherein the soil is contacted with a reagent mixture comprising an alkaline compound and dimethyl sulfoxide. The reagent mixture desorbs halogenated organic compounds from the soil and then reacts with them, but the technique is not satisfactory because the soil, sediment, or sludge is dried before the chemical reaction takes place, the process is inefficient, and most importantly, dimethyl sulfoxide is extremely hazardous to employ because it is capable of introducing toxic contaminants through the skin of workers at the site.

Pytlewski et al., in U.S. Pat. Nos. 4,337,368, 4,400,552, 4,349,380, 4,417,977, 4,430,208, 4,471,143, 4,460,797, 4,602,994, and 4,523,043, disclose advantageous processes for decomposing toxic halogenated organic compounds with a decomposition reagent which is the reaction product of an alkali metal hydroxide and a polyglycol, or the monoalkyl ether thereof. The decomposition reagent of Pytlewski et al. may be formed outside the reaction zone or may be formed within a reaction zone by the reaction of the hydroxide and polyglycol, and, optionally, oxygen. The Pytlewski et al. processes are sometimes referred to by the acronyms NaPEG ® or KPEG ™.

The methods and reagents described in Pytlewski et al. are advantageous because the reagents are relatively inexpensive and are capable of reacting quickly and efficiently with wet or dry soil, sediment, or sludges to reduce the level of PCBs and other contaminants to environmentally acceptable levels.

The Environmental Protection Agency (EPA) has recently developed a process based upon the technology of Pytlewski et al. known as the "base catalyzed destruction method." This process, which is a variant of the NaPEG ® or KPEG ™ technology, comprises adding an aqueous solution of polyethylene glycol (PEG) to a contaminated soil containing halogenated organic compounds. An alkali metal hydroxide is then added to the contaminated soil. The water added with the PEG distributes the reagents throughout the soil and acts as a wetting agent. The contaminated soil is then heated at a temperature and for a time sufficient to substantially dehydrate the soil leaving the reagents nevertheless well distributed throughout the soil and concentrated to a very reactive state. The soil is then further heated to a temperature between about 100° and 300° C. for a time sufficient to effect destruction of the halogenated organic compounds. Lastly, an acid is added to the soil in an amount sufficient to neutralize the alkali metal hydroxide so that the soil may be returned to its original environment.

Figure 1:
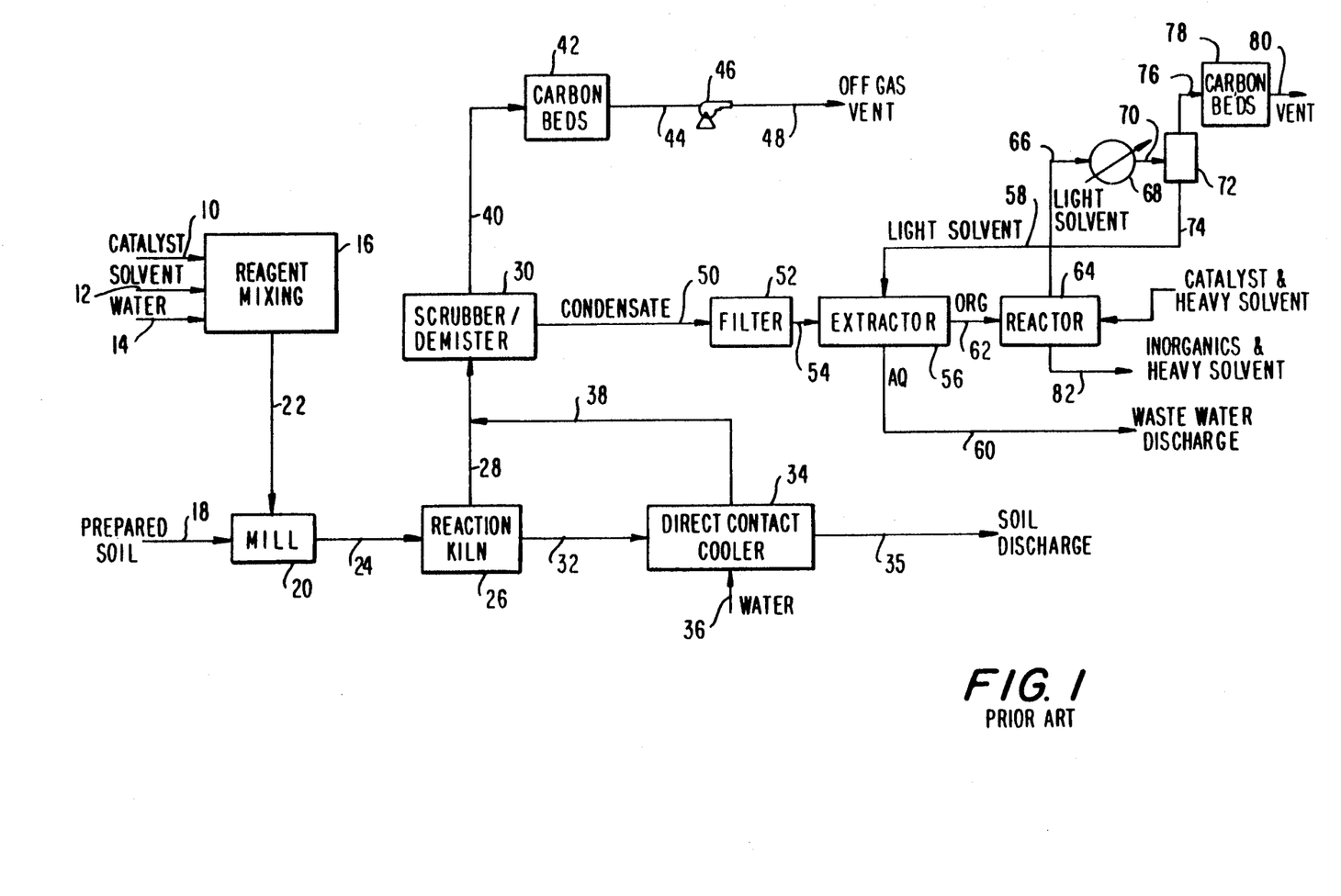
FIG. 1 is a simplified flow sheet showing the EPA base catalyzed decomposition process.

The EPA process, discussed in further detail below in connection with FIG. 1, is highly inefficient. For example, PCBs are vaporized together with water in the reaction zone. After condensation in a light solvent and decantation of solvent-PCBs solution from water, the PCBs are chemically destroyed in a separate reaction system. The capital costs and utility costs of this process are prohibitive.

OBJECTS OF THE INVENTION

It is thus a primary object of this invention to provide a cost effective method for the substantially complete dehalogenation of haloorganic contaminants in soils, sediments, and sludges.

It is a further object of this invention to provide a process for treating wet or dry soils, sediments, or sludges containing PCBs with a chemical decomposition process in a reaction zone.

It is still a further object of this invention to adapt the NaPEG ® and KPEG ™ PCB decomposition technology of Pytlewski et al. into an efficient process for the decontamination of soils, sediments, and sludges.

It is a further and related object of this invention to improve on the EPA adaptation of the Pytlewski et al. technology in its base catalyzed decomposition process and to decrease the capital and operating costs of such process.

It is still a further object of this invention to provide methods for the efficient handling of PCB-contaminated water vapor streams in processes for the decontamination of wet soils, sediments, sludges, or such processes wherein water is introduced with the reactants.

SUMMARY OF THE INVENTION

These and other objects of the invention are achieved in processes for the decontamination of a soil, sediment, or sludge containing toxic halogenated organic compounds and containing water which comprises the following steps.

A soil, sediment, or sludge ("soil") is mixed with a reagent (e.g., NaPEG ® or KPEG ™ or the constituents thereof) which is capable of reacting with the halogenated organic compounds. That mixture is heated in a reaction zone at an elevated temperature. A reaction zone vapor stream is thereby formed which contains at least a portion of the water contained in the soil and unreacted halogenated organic compound. A portion of that reaction zone vapor stream is then condensed under conditions suitable for the formation of a condensate stream containing substantially all of the halogenated organic compound. A residual vapor stream is also formed which contains water and trace amounts of halogenated organic compound. The condensate stream is recycled to the reaction zone, thereby permitting further reaction of the halogenated organic compound with the decomposition reagent. The residual vapor stream is treated to remove trace halogenated organic compound, e.g., in a carbon bed, and is vented to the atmosphere. Soil, sediment, or sludge containing environmentally acceptable levels of contaminant and the nontoxic byproducts of the decomposition reaction are removed from the reaction zone.

DETAILED DESCRIPTION OF THE INVENTION AND PREFERRED EMBODIMENTS

Definitions

Haloorganic contaminants include halogenated, in particular chlorinated and brominated, aromatic and aliphatic compounds. Representative of such compounds are chlorinated and polychlorinated phenols and benzenes. Representative of the halogenated aliphatic compounds are trichloroethylene and carbon tetrachloride. Halogenated compounds which are frequently found in contaminated soils include PCBs, complex polychlorinated biphenyls, e.g., dichlorodiphenyltrichloroethylene (DDT), dioxins, tetrachlorodibenzofurans, and commercial mixtures known as Arochlors. From time to time, the terms haloorganic or halogenated organic contaminants, and PCBs, are used interchangeably.

The terms "soil," "sediment," and "sludge" are used herein in their normally accepted usage. From time to time, the word "soil" is used to represent soils, sediments, and sludges.

By "substantially complete dehalogenation of organic contaminants" is meant the removal of substantially all of the halo atoms from all of the haloorganic compounds in the soil, or, the removal of all of the halo atoms from substantially all of the haloorganic compounds in the soil, or, the removal of substantially all of the halo atoms from substantially all of the haloorganic compounds in the soil.

By "detoxification" or "detoxify" is meant removal of only that number of halo atoms necessary to convert, e.g., a highly chlorinated PCB (hexachlorobiphenyl) into a less toxic form, e.g., dichlorobiphenyl. Less highly chlorinated PCBs are less toxic and are more easily metabolized by bacterial action in the treated soil.

DESCRIPTION OF THE EPA BASE CATALYZED DESTRUCTION PROCESS

Referring to FIG. 1, an alkali metal hydroxide, e.g., potassium hydroxide (KOH), a solvent, e.g., polyethylene glycol (PEG), and water are introduced via lines 10, 12, and 14 respectively into a reagent mixing zone 16. Contaminated soil is subjected to size classification (pieces larger than six inches are rejected and subjected to alternative decontamination steps), crushed to less than one inch, and stockpiled. The prepared soil is passed via line 18 to a Pug Mill 20, a double screw blender, wherein it is intimately mixed with a reagent stream 22 from reagent mixing zone 16.

The mixture of soil and reagent passes via line 24 to indirectly fired rotary reaction kiln 26. Reaction kiln 26 is indirectly heated to temperatures in the range of from 230° to 400° C. At such temperatures, the pressure in the kiln being from −10 psig to 50 psig, a substantial fraction of the PCBs contained in the contaminated soil are volatilized together with water and this vapor stream passes continuously via line 28 to a scrubber/demister 30. Processed soil from the reaction kiln 26 passes via line 32 to a direct contact cooling auger 34. Water is introduced to cooling auger 34 via line 36 to cool the soil, and, because the soil may contain unconverted catalyst, e.g., sodium hydroxide (NaOH) or potassium hydroxide (KOH), acid may be introduced together with water to neutralize the excess base. Any vapors generated in contact cooler 34 pass via line 38 to scrubber/demister 30. Clean soil is discharged via line 35.

The volatilized water and PCBs are recovered in scrubber/demister 30, which is a Venturi scrubber. Residual gas stream 40 passes out of scrubber/demister 30 to a carbon bed 42 wherein any trace PCBs are removed. The residual vapor stream, free of PCBs, is vented to the atmosphere via line 44, vacuum pump 46, and vent line 48.

The condensate from scrubber/demister 30 containing water and PCBs passes via line 50 to filter 52 which removes any entrained sediment. The condensate then passes via line 54 to an extractor 56 wherein it is extracted with a light solvent, e.g., diesel oil or preferably toluene or kerosene is introduced via line 58. The light solvent removes the PCBs contained in the water. The light solvent containing PCBs is separated from the water in a decanter (not shown), thereby forming wastewater discharge stream 60 and a substantially water-free stream of light solvent-PCBs which passes via line 62 to reactor 64 for further processing.

In reactor 64, the light solvent-PCB solution is contacted with a base "catalyst," e.g., NaOH, in a heavy solvent, e.g., PEG. The reactor operates in a boiling mode, i.e, at the boiling point of the light solvent, and the PCBs are chemically decomposed. The light solvent which is vaporized in reactor 64 passes via line 66 to a condenser 68. The condensate passes via line 70 to a demister 72. The condensate, comprising essentially light solvent, is recycled via line 74 to extractor 56. Residual vapor passes via line 76 to a carbon bed 78 to remove trace amounts of PCBs contained therein and is then vented to the atmosphere via line 80. Heavy solvent and the decomposition products of the PCBs, e.g., sodium chloride or potassium chloride and lower halogenated or dehalogenated organic compounds, pass via line 82. This stream must be stored for further disposal.

The process described in FIG. 1 combines the disadvantages of thermal desorption, solvent extraction, and two chemical reaction zones, one in reaction kiln 26 and the other in reactor 64. A dischargeable wastewater stream is not formed by decantation of light solvent-PCBs from water in extractor 54 and the decantation vessel associated therewith. One or more stages of decantation, or a stripper is required to achieve that objective. Recovery of fines in filter 52 is also not accomplished successful because colloidal size aerosol particles formed in the kiln pass through the filter carrying adsorbed PCBs, distribute them in extractor 56, and ultimately carry them into the decanted wastewater.

The boiling reactor 64 is both utility intensive and difficult to operate. The use of a cooling auger to cool and neutralize the processed soil is also improvident in that a highly exothermic, infinitely fast reaction is designed to occur therein, which if not controlled, may lead to pH runaway, and equipment corrosion and failure.

Still a further disadvantage of the EPA process is that the use of vacuum operation in the two off-gas systems leads to passage of gas through the reactor and thence to one or both overhead systems. A positive pressure, sealed system would remove the problems attendant to such vacuum operation.

Most importantly, the combination of thermal desorption, solvent extraction, and two separate chemical reaction zones, leads to a proliferation of equipment items, extremely high capital costs, operating inefficiency, mechanical unreliability, and unacceptable economics.

DESCRIPTION OF THE INVENTION

It has now been found that the objects of the invention can be achieved by reacting soil, which may be wet or dry, together with a decomposition reactant, or the constituent compounds thereof, in a heated reaction zone, condensing the vapor stream which forms in the reaction zone comprising water vapor and vapors of halogenated organic compounds, returning the condensate from the condensation zone directly to the reaction zone so that halogenated organics contained therein are recycled to the reaction zone and can react therein, removing residual vapors from the condensation zone and passing them through a demister to separate water (the net water introduced into the system via the decomposition reactant and/or wet soil), and removing residual vapors through a conventional carbon bed or the like to remove trace amounts of halogenated organics.

Figure 2:
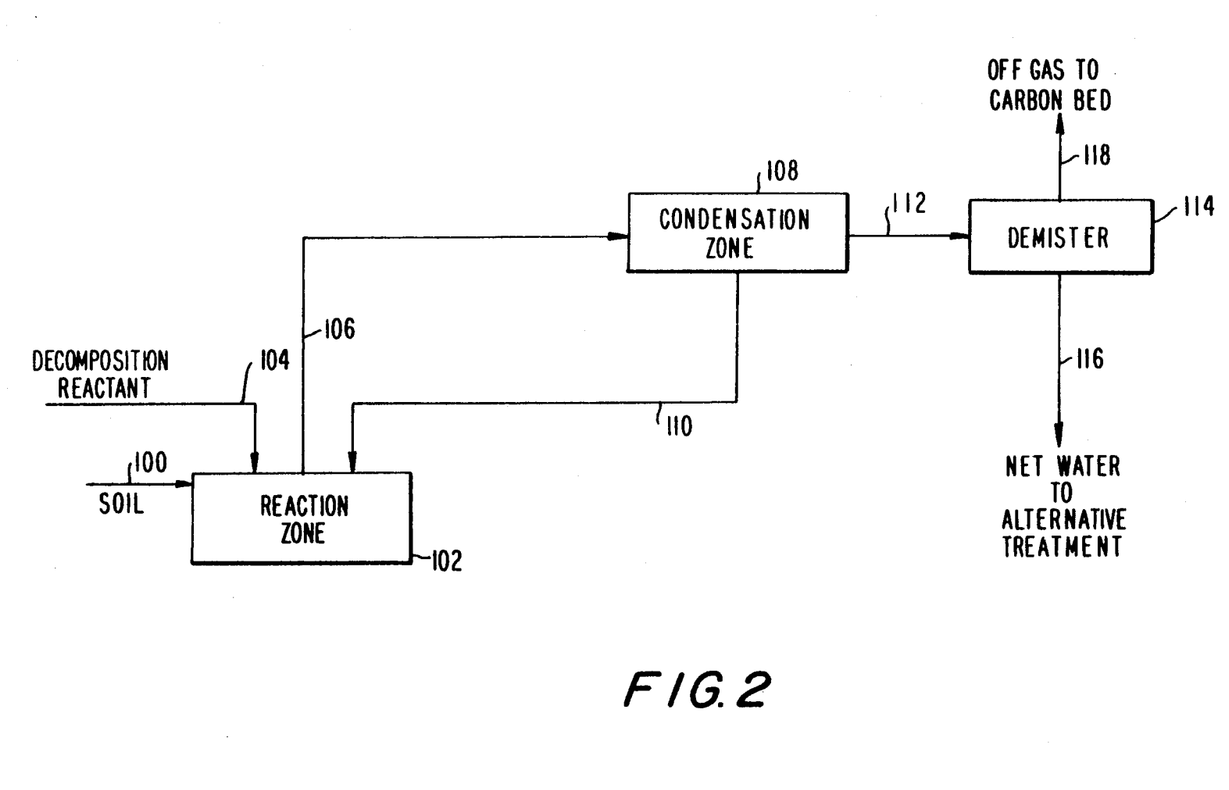
FIG. 2 is a simplified flow sheet for the process of the invention.

With reference to FIG. 2, soil, which has been size classified and prepared as described above, is passed via line 100 to reaction zone 102, which may be a rotating kiln as described above. A decomposition reactant is introduced via line 104 to reaction zone 102. Decomposition reactant may be, e.g., KPEG TM or NaPEG ®, as described in Pytlewski et al. patents or may comprise the constituent compounds of KPEG TM or NaPEG ®, i.e., KOH or NaOH and PEG, and may further include water as a distribution agent as described in FIG. 1. It will be understood by those skilled in the art that the advantages of the invention are in large part in the handling of water introduced into the system via wet soil or as a decomposition reactant distribution agent.

Reaction zone 102 is heated by means not shown to a temperature of from 200° to 400° C., preferably from 240° to 350° C. Maintaining the mixed soil and a decomposition reactant under such conditions effects a substantially complete decomposition reaction of the PCBs, and results in the formation of a reaction zone vapor comprising water and PCBs which passes via line 106 to a condensation zone 108.

Condensation zone 108 may be a direct or indirect condenser, and is typically maintained at a temperature of 30° to 250° C., and preferably from 90° to 190° C. The condensation zone is operated, as will be understood by those skilled in the art, under conditions such that a substantial portion of the water in reaction zone vapor stream 106 and substantially all of the PCBs contained therein are condensed. The condensate is returned via line 110 to reaction zone 102, thereby permitting the PCBs to again be contacted with reagent under decomposition reaction conditions.

The vapor stream leaving condensation zone via line 112 comprises water vapor and trace amounts of PCBs. It passes to demister 114 which separates a water stream containing trace amounts of PCBs via line 116 and a vapor stream containing trace amounts of PCBs via line 118. Water stream 116 contains the net water added to the reaction system via the wet soil and/or the decomposition reactant. It may be passed through carbon beds, extraction systems, or adsorption beds to remove the trace amounts of PCBs, and the cleaned water is purged from the system. Likewise, vapor stream 118 is passed through a carbon bed which picks up trace amounts of PCBs and is then vented to the atmosphere.

The reaction zone, condensation zone, and downstream equipment may be maintained under vacuum or may be at a positive pressure relative to the atmosphere. Desirably, the pressure is from −10 to 50 psig, and preferably the pressure is from −5 to 30 psig. By operation in this manner, it is unnecessary to use vacuum equipment.

DESCRIPTION OF THE PREFERRED EMBODIMENT

Figure 3:
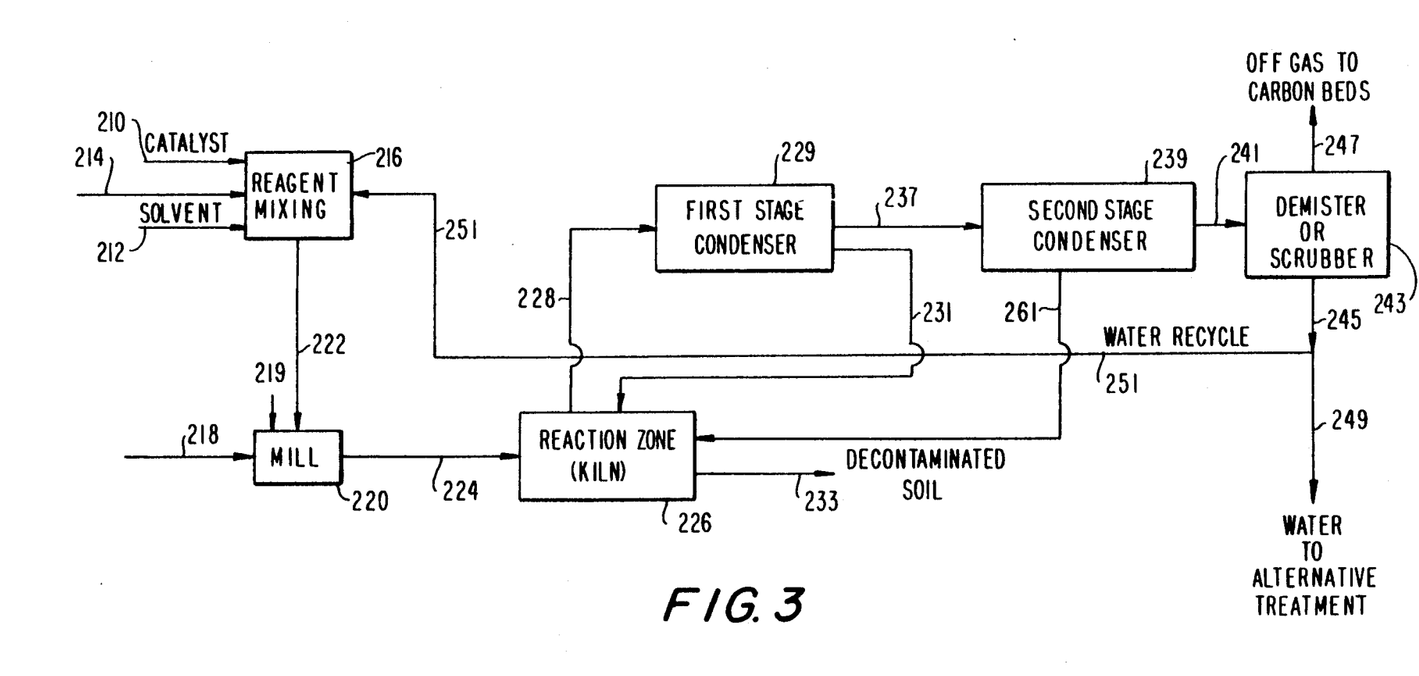
FIG. 3 is a flow sheet showing a preferred embodiment of the process of the invention.

The process flowsheet shown in FIG. 3 is the improved embodiment of the invention, and is specifically an improvement to the EPA process. Process streams and apparatus in FIG. 3 are numbered such that the last two digits correspond to similarly identified items in FIG. 1. Catalyst 210 and solvent 212 are introduced into a reagent mixing zone 216 as described above in connection with FIG. 1. Makeup water, for distributing the reagent in the soil, is introduced via line 214 and recycled process water is introduced via line 251. The mixed reagent passes via line 222 to Pug Mill 220. Prepared soil, i.e., soil that has been classified and crushed but not dried, is introduced into Pug Mill 220 via line 218. The reagent and the soil are thoroughly mixed in Pug Mill 220, and the mixture passes via line 224 to reaction kiln 226. The mixture is heated in kiln 226 to a temperature of from 200° to 400° C. and preferably from 240° to 350° C. by preferably indirect heating means not shown, as is known in the art. Maintaining the mixture at a temperature within the above ranges results in the decomposition reaction of the PCBs contained in the soil with the decomposition reactant.

A reaction zone vapor stream is formed under the conditions of the reaction and comprises water vapor, unreacted PCBs, and organic products of the PCB decomposition reaction, e.g., biphenyl. The reaction zone vapor passes via line 228 to a first stage condenser 229. Condenser 229 may be an indirect, water-cooled condenser. The condenser is maintained at a temperature of from 30° to 250° C. and preferably from 90° to 190° C. such that a condensate is formed which comprises water and substantially all of the PCBs contained in reaction zone vapor stream 228. This condensate is recycled via line 231 to reaction zone 226. Thus the PCBs contained in the condensate of the first stage condenser, which represent substantially all of the PCBs vaporized from the reaction zone, are returned for reaction in the kiln. Likewise, dechlorinated organic compounds vaporized from kiln 226 are returned to the reaction zone.

Decontaminated soil is removed from kiln 226 via line 233. A major advantage of the process of the invention is that the decontaminated soil contains the non-toxic halogenated organic compounds or dehalogenated organic compounds which are produced in the reaction zone and there is no separate step required to dispose of these materials.

The vapor stream from the first stage condenser passes via line 237 to second stage condenser 239. Second stage condenser 239 may also be an indirect water-cooled condenser. Second stage condenser 239 is desirably maintained at a temperature of from 10° to 100° C. and preferably from 30° to 90° C. The first stage condenser vapor stream which passes to second stage condenser 239 via line 237 contains trace amounts of PCBs. It is condensed in condenser 239, forms a second condensate comprising water containing trace amounts of PCBs and a second stage condenser vapor stream containing trace amounts of PCBs.

The mixed vapor and condensate pass via line 241 to demister 243. Demister 243 separates the second stage condenser condensate into water stream 245 and vapor stream 247. Vapor stream 247 is passed through conventional equipment to remove trace amounts of PCBs, e.g., through carbon beds, and the cleaned vapor is vented to the atmosphere. Water stream 245 may be purged from the system through alternative treatment means such as carbon beds, extractors, adsorption units, or the like, in order to remove trace amounts of PCBs. The purged stream is shown by reference numeral 249. Alternatively, a portion of water stream 245 may be recycled via line 251 to reagent mixing zone 216. By recycling water, less makeup water need be added via line 214 to reagent mixing zone 216, thereby reducing the overall energy required to vaporize water in the system. Where water is recycled via line 251, the net water introduced into the system via line 214 and in Wet soil introduced via line 218 is removed via line 249.

The invention is also in a process wherein the reaction is carried out in the presence of an inert hydrocarbon. The hydrocarbon serves as a common phase for the PCBs and the reagent. The hydrocarbon should have a boiling point equal to or greater than the temperature of the reaction. In addition to facilitating the reaction, the presence of the hydrocarbon facilitates the thermal desorption of unreacted PCBs and the decomposition reaction products formed in the reaction zone.

Thermal desorbers are described in, e.g., U.S. Pat. Nos. 4,864,942 and 4,738,206.

As shown in FIG. 3, the hydrocarbon used in the process is introduced into Mill 220 via makeup line 219. The source of hydrocarbon is, in whole or in part, oil contained in the contaminated soil, sediment, or sludge, e.g., PCB-containing transformer oil which has previously been discarded. A portion of the hydrocarbon passes overhead from reaction zone 226 via line 228. It is condensed in first stage condenser 229 together with the PCBs and is recycled to reaction zone 226. Trace amounts passing via vapor line 237 are condensed in second stage condenser 239 and recycled to reaction zone 226 via line 261.

Figure 4:
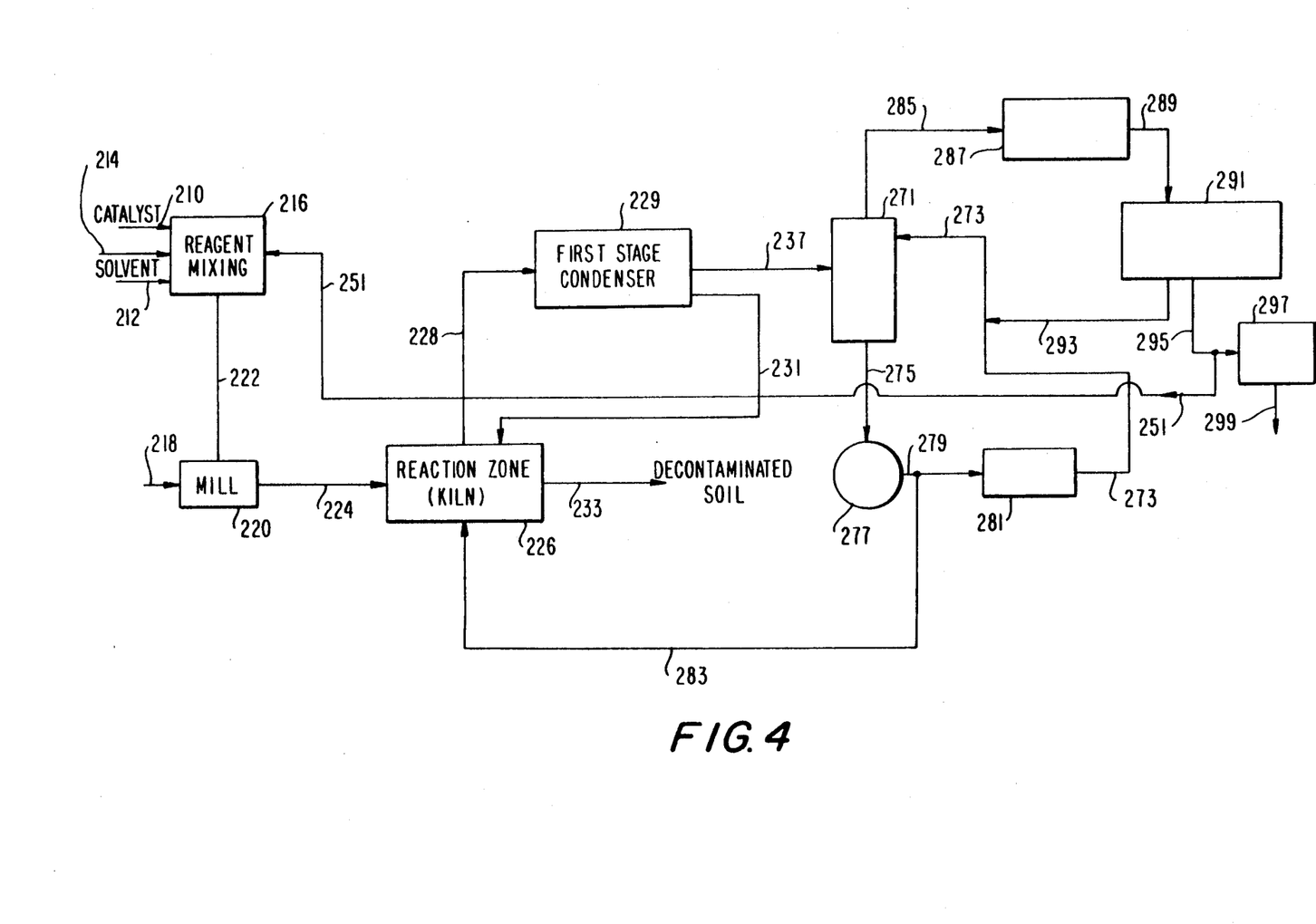
FIG. 4 is a flow sheet showing an alternative preferred embodiment of the process of the invention.

FIG. 4 shows an alternative preferred embodiment of the invention wherein oil (either freshly added or supplied, in whole or in part, from the soil being remediated) is present in the reaction system. The reagent mixing zone, Mill, reaction zone, and first stage condenser are substantially as described in connection with FIG. 3 and like numbers are used. The reaction takes place in zone 226 in the presence of a hydrocarbon. Some of the hydrocarbon passes overhead from reaction zone 226 via line 228 to first stage condenser 229 and is condensed therein together with a major portion of the PCBs and returned via line 231 to reaction zone 226. The vapor leaving first stage condenser 229 passes via line 237 to direct-contact scrubber 271 where it passes countercurrently to cooled hydrocarbon introduced to scrubber 271 via line 273. Trace amounts of PCB are condensed in scrubber 271 and pass via line 275 to pump 277. The effluent from pump 277 passes via line 279 to filter and cooler 281 and is recycled via line 273 to scrubber-condenser 271. A portion of the condensed oil containing PCBs in line 279 is recycled via line 283 to reaction zone 226, wherein the PCBs have a further opportunity to be destroyed. Vapors from scrubber 271 pass overhead via line 285 to condenser 287. The condensate formed passes via line 289 to phase separator 291 wherein residual hydrocarbon is separated from water. The hydrocarbon passes via line 293 and line 273 to scrubber 271 and the water passes via line 295 to alternative treatment zone 297 wherein residual quantities of PCBs are removed. The treated water is discharged via line 299 from the process system. A portion of the water formed in phase separator 291 is recycled via lines 295 and 251 to reagent mixing zone 216. The discharge via line 299 represents the net water introduced to the process via the soil, sediment, or sludge and/or the decomposition reagent.

The processes of the invention are substantially improved over the prior art. As is apparent from comparison of FIGS. 2 and 3 with FIG. 1, substantially less mechanical equipment and piping is necessary to achieve the soil remediations contemplated in the processes of the invention. This leads to substantially lowered capital costs. Utilities are also reduced insofar as less water need be vaporized and condensed in the processes of the invention, and there is no need to vaporize and subsequently condense an extrinsic hydrocarbon stream. Another advantage of the process of the invention is that only a single reaction need be controlled and operated, whereas in the prior art process, reaction takes place both in kiln 26 and in reactor 64.

The processes of the invention are more efficient insofar as all of the PCBs introduced in the contaminated soil are destroyed in the reaction kiln. Substantially all of the PCBs contained in the reaction zone vapor stream, which pass via line 228 to first stage condenser 229, are condensed therein and are recycled to reaction kiln 226 via Trace PCBs contained in the condensate from the second stage condenser are also recycled via line 251 for further reaction in kiln 226. Only the net water introduced into the remediation system is purged via line 249 and that amount of water is less than that introduced into the remediation system in the prior art process. The load on the alternative water treatment system is also reduced.

There is also no need to dispose of a stream of heavy solvent containing inorganic salts and dechlorinated or partially dechlorinated organic compounds, as is necessary with purge stream 82 in the process of FIG. 1. All of the nontoxic halogenated organic compounds as well as fully dechlorinated organics and inorganic salts, which are the products of the decomposition reaction, are discharged in the decontaminated soil via line 233.

WHAT IS CLAIMED IS:

1. A method for the decontamination of a soil, sediment, or sludge containing toxic halogenated organic compound and containing water comprising the steps of:
    (a) mixing said soil, sediment, or sludge with a reagent capable of reacting with said halogenated compound and heating said mixture of soil, sediment, or sludge and reagent in a reaction zone to an elevated temperature thereby forming a reaction zone vapor stream containing at least a portion of the water contained in said soil, sediment, or sludge and unreacted halogenated organic compound;
    (b) condensing a portion of said reaction zone vapor stream under conditions suitable for the formation of
        (i) a condensate stream containing substantially all of the halogenated organic compound in said reaction zone vapor stream, and
        (ii) a vapor stream containing water and trace amounts of said halogenated organic compound;
    (c) recycling said condensate to said reaction zone;
    (d) treating said vapor stream to remove trace halogenated organic compound and venting the so-treated stream to the atmosphere; and
    (e) removing soil, sediment, or sludge containing less contaminant from said reaction zone.

2. A method for the decontamination of a soil, sediment, or sludge containing a toxic halogenated organic compound and containing water, comprising the steps of:
    (a) heating a soil, sediment, or sludge containing a toxic halogenated organic compound with reagent capable of reacting with and decomposing said contaminant, under elevated temperature conditions in a reaction zone, and thereby forming a reaction zone vapor stream containing water and unreacted halogenated organic compound;
    (b) condensing a portion of the said reaction zone vapor stream in a first condensation zone under conditions suitable for the formation of
        (i) a first condensation zone condensate containing substantially all of the halogenated organic compound, and
        (ii) a first condensation zone vapor stream containing trace amounts of said halogenated organic compounds;
    (c) recycling said first condensation zone condensate to said reaction zone;
    (d) passing the first condensation zone vapor stream to a second condensation zone and condensing same therein to form a second condensation zone condensate comprising water and a second condensation zone vapor stream containing trace amounts of halogenated organic compound;
    (e) treating said second condensation zone condensate to remove trace halogenated organic compound and purging said so-treated second condensation zone condensate from said reaction system; and
    (f) treating said second condensation zone vapor stream to remove trace halogenated organic compound and venting the so-treated stream to the atmosphere.

3. A method as recited in claim 2 wherein a portion of the second condensation zone condensate is recycled to said reaction zone.

4. A method as recited in claim 2 wherein said decomposition reagent comprises an alkali metal hydroxide and a polyethylene glycol.

5. A method as recited in claim 4 wherein said decomposition reagent also includes water.

6. A method for the decontamination of a soil, sediment, or sludge containing a toxic halogenated organic compound and containing water comprising the steps of:
    (a) forming, in a mixing zone, a reaction mixture comprising
        (i) a soil, sediment, or sludge containing a toxic halogenated organic compound,
        (ii) a decomposition reagent capable of reacting with the halogenated organic compound to decompose same, and
        (iii) water;
    (b) reacting said mixture in a reaction zone under elevated temperature conditions and thereby forming a reaction zone vapor stream containing unreacted halogenated organic compound;
    (c) condensing said reaction vapor stream in a condensation zone to form a condensation zone condensate containing water and containing substantially all of the halogenated organic compound in said reaction zone vapor stream containing water and trace amounts of said halogenated organic compound;
    (d) recycling said condensation zone condensate to said reaction zone or to said mixing zone; and
    (e) treating the said condensation to remove trace halogenated organic compound and venting the so-treated vapor stream to the atmosphere.

7. A method as recited in claim 6 wherein the soil component of the soil, sediment or sludge mixed in said mixing zone is a wet soil.

8. A method as recited in claim 7 wherein the soil component of the soil, sediment or sludge introduced to the said mixing zone is a wet soil.

9. A method as recited in claim 7 wherein the soil component of the soil, sediment or sludge introduced to the said mixing zone is a dry soil.

10. A method as recited in claim 6 wherein the soil component of the soil, sediment or sludge introduced to said mixing zone is dry.

11. A method as recited in claim 6 wherein said decomposition reactant comprises sodium or potassium hydroxide and polyethylene glycol.

12. A method for the decontamination of a soil, sediment, or sludge containing a toxic halogenated organic compound and containing water, comprising the steps of:
  (a) forming, in a mixing zone, a mixture comprising
    (i) a soil, sediment, or sludge containing a halogenated organic compound contaminant,
    (ii) a decomposition reagent capable of reacting with said halogenated organic compound to decompose same, and
    (iii) water;
  (b) reacting said mixture in a reaction zone under elevated temperature conditions and thereby forming a reaction zone vapor stream containing water and unreacted halogenated organic compound;
  (c) passing said reaction zone vapor stream to a first condensation zone and forming therein
    (i) a first condensation zone condensate containing water and substantially all of the halogenated organic compound contained in said reaction zone vapor stream, and
    (ii) a first condensation zone vapor stream containing water and trace amounts of halogenated organic compounds;
  (d) recycling said first condensation zone condensate to said reaction zone or to said mixing zone;
  (e) passing the first condensation zone vapor stream to a second condensation zone and condensing same therein to form a second condensation zone condensate containing trace amounts of halogenated organic compound and a second condensation zone vapor stream containing trace amounts of halogenated organic compound;
  (f) treating the second condensation zone condensate to remove trace halogenated organic compound and purging the so-treated second condensation zone condensate from the reaction system; and
  (g) treating said second condensation zone vapor stream to remove trace halogenated organic compound and venting the so-treated vapor stream to the atmosphere.

13. A method as recited in claim 12 wherein a portion of the second condensation zone condensate is recycled to the reaction zone or to the mixing zone.

14. A method as recited in claim 12 wherein said soil, sediment, or sludge contains water.

15. A method as recited in claim 12 wherein said decomposition reagent is introduced into said soil, sediment, or sludge in water solution.

16. A method as recited in claim 12 wherein the soil component of the soil, sediment or sludge introduced to the said mixing zone is a wet soil.

17. A method as recited in claim 13 wherein the soil component of the soil, sediment or sludge introduced to the said mixing zone is a dry soil.

18. A method for the decontamination of a soil, sediment, or sludge containing halogenated organic compound, comprising the steps of:
  (a) mixing said soil, sediment, or sludge with an inert hydrocarbon and a reagent capable of reacting with said halogenated compound;
  (b) heating said mixture of soil, sediment, or sludge and reagent in a reaction zone to an elevated temperature thereby forming a reaction zone vapor stream containing a hydrocarbon and unreacted halogenated organic compound;
  (c) condensing a portion of said reaction zone vapor stream under conditions suitable for the formation of
    (i) a condensate stream containing hydrocarbon and substantially all of the halogenated organic compound in said reaction zone vapor stream, and
    (ii) a vapor stream containing trace amounts of said halogenated organic compound;
  (d) recycling said condensate to said reaction zone;
  (e) treating said vapor stream to remove trace halogenated organic compound and venting the so-treated stream to the atmosphere; and
  (f) removing soil, sediment, or sludge containing less contaminant from said reaction zone.

19. A method as recited in claim 18 wherein said water solution of decomposition reactant is sprayed on said soil, sediment, or sludge.

20. A method for the decontamination of a soil, sediment, or sludge containing halogenated organic compound, comprising the steps of:
  (a) mixing said soil, sediment, or sludge with an inert hydrocarbon and a reagent comprising sodium or potassium hydroxide and polyethylene glycol, said reagent being in a water solution and being capable of reacting with said halogenated compound;
  (b) heating said mixture of soil, sediment, or sludge and reagent in a reaction zone to an elevated temperature thereby forming a reaction zone vapor stream containing a hydrocarbon, water, and unreacted halogenated organic compound;
  (c) condensing a portion of said reaction zone vapor stream under conditions suitable for the formation of
    (i) a condensate stream containing hydrocarbon and substantially all of the halogenated organic compound in said reaction zone vapor stream, and
    (ii) a vapor stream containing water and trace amounts of said halogenated organic compound;
  (d) recycling said condensate to said reaction zone;
  (e) treating said vapor stream to remove trace halogenated organic compound and venting the so-treated stream to the atmosphere; and
  (f) removing soil, sediment, or sludge containing less contaminant from said reaction zone.

* * * * *